United States Patent [19]

Schwerdt

[11] Patent Number: 5,123,634
[45] Date of Patent: Jun. 23, 1992

[54] ELASTOMERIC SLEEVE SPRING WITH AXIALLY SPACED SPRING BODIES

[75] Inventor: Hans-Werner Schwerdt, Laudenbach, Fed. Rep. of Germany

[73] Assignee: Firma Carl Freudenberg, Weinheim/Bergstr., Fed. Rep. of Germany

[21] Appl. No.: 723,729

[22] Filed: Jun. 20, 1991

Related U.S. Application Data

[63] Continuation of Ser. No. 471,162, Jan. 26, 1990, abandoned.

[30] Foreign Application Priority Data

Mar. 23, 1989 [DE] Fed. Rep. of Germany ....... 3909609

[51] Int. Cl.⁵ ................................................ F16F 5/00
[52] U.S. Cl. .............................. 267/140.1 C; 267/219; 248/562
[58] Field of Search .............. 267/140.1 R, 140.1 C, 267/141.2, 35, 219, 281, 293; 248/562, 636, 566; 180/300, 312

[56] References Cited

U.S. PATENT DOCUMENTS

| | | | |
|---|---|---|---|
| 4,700,934 | 10/1987 | Andra et al. | 267/140.1 C |
| 4,717,111 | 1/1988 | Saito | 267/140.1 C |
| 4,771,990 | 9/1988 | Dormer et al. | 267/219 X |
| 4,811,933 | 3/1989 | Inagaki et al. | 267/140.1 C |
| 4,822,010 | 4/1989 | Thorn | 267/219 X |
| 4,840,357 | 6/1989 | Jouade | 267/140.1 C |
| 4,840,359 | 6/1989 | Hamaekers et al. | 267/140.1 C |
| 4,861,005 | 8/1989 | Bausch | 267/140.1 C |
| 4,936,556 | 6/1990 | Makibayashi et al. | 267/140.1 R |

FOREIGN PATENT DOCUMENTS

| | | | |
|---|---|---|---|
| 0009120 | 4/1980 | European Pat. Off. | |
| 0063141 | 5/1981 | Japan | 267/141.2 |
| 0220737 | 9/1989 | Japan | 267/140.1 C |
| 0008524 | 1/1990 | Japan | 267/293 |
| 2004621 | 4/1979 | United Kingdom | 267/141.2 |

Primary Examiner—Matthew C. Graham
Assistant Examiner—Josie A. Gallato
Attorney, Agent, or Firm—Felfe & Lynch

[57] ABSTRACT

A rubber sleeve spring having hydraulic damping includes an internal and an external tube 1, 2 which are radial-elastically supported on one another by means of a first spring body 3. A second spring body 10 is provided corresponding to the first spring body 3. The second spring body is disposed in the gap between the internal and the external tube 1, 2 at a radial distance to the first spring body 3. The second spring body 10 can optionally be connected to the internal and/or the external tube 1, 2.

4 Claims, 1 Drawing Sheet

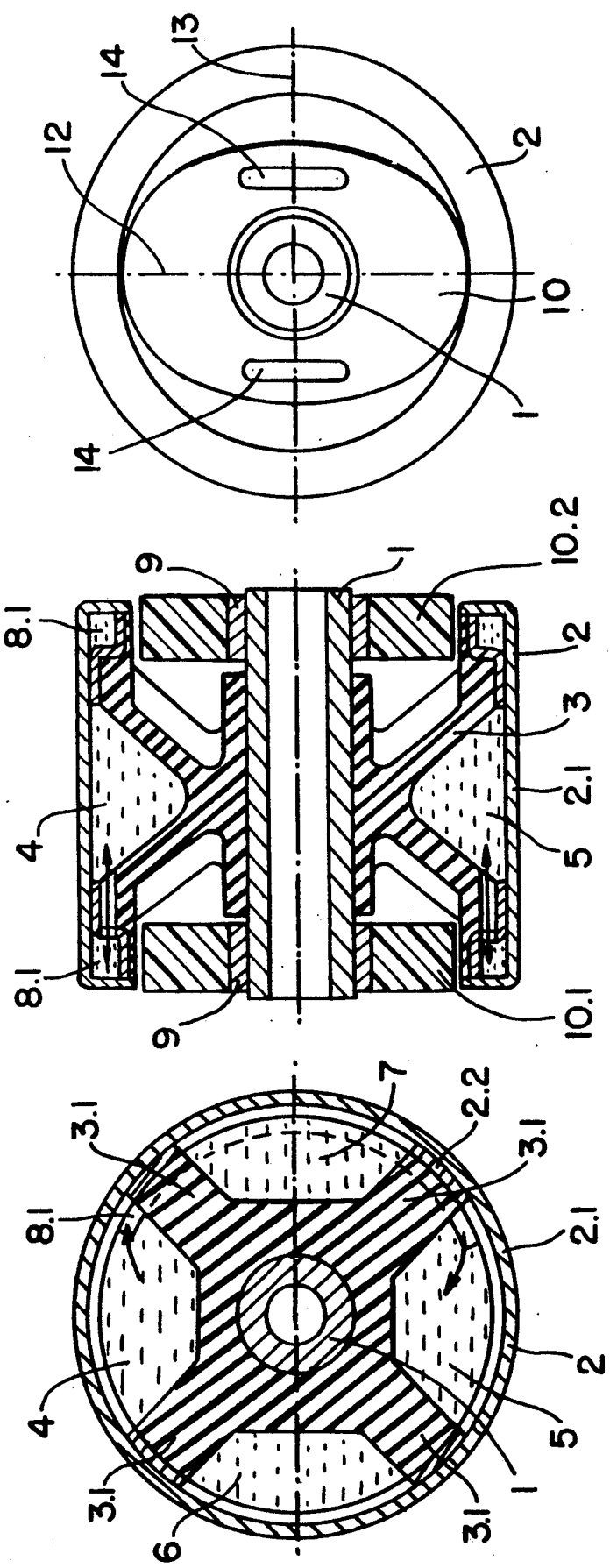

ELASTOMERIC SLEEVE SPRING WITH AXIALLY SPACED SPRING BODIES

This application is a continuation of application Ser. No. 471,162, filed Jan. 26, 1990, now abandoned.

The invention relates to an elastomeric, preferably rubber, sleeve spring.

A rubber sleeve spring of this general type is known from EP-A 0 009 120. It discloses that the internal and the external tube support one another radial-elastically on one single spring body which defines the elastic bearing strength in a certain way. A rubber sleeve spring of this kind can thus be used to its best efficiency only in a very determined application. Hence, deviations from the originally determined stress always negatively affect the damping and insulating properties which are to be achieved according to the object of the invention.

It is an object of the invention to further develop a rubber sleeve spring of this general type such that the elastic properties can be modified with respect to the particular demands of the application and adjusted to the respective conditions according to the object.

The object is achieved in accordance with the invention with a rubber sleeve spring of the aforesaid type in that the second spring body 10 is provided corresponding to the first spring body 3 and in that the second spring body is disposed axially spaced-apart from the first spring body in the gap between the internal and the external tube. Due to the axial spacing, the first and the second spring body can be independently moved.

Acoustically effective, high-frequency vibrations are thus extraordinarily well insulated; it should be noted in particular that when the rubber sleeve spring in accordance with the invention is subject to stress, the resulting pressure increases in the liquid-filled chambers have no effects on the area of the second spring body and do not cause any elastic prestress to develop therein.

The elastic bearing strength of the first and the second spring body can be adjusted to one another in almost any desired way. Preferably used are applications wherein the first spring body supports less than 50% of the entire load during the use according to the object. The swell elasticity of the liquid-filled chambers which are contained in this spring body, however, must be sufficiently great so as to ensure that liquid be pressed through in case relative displacements of the internal tube occur with respect to the external tube while achieving a damping effect in the damping opening. The marginal conditions to be observed are known to the experts versed in this field.

The second spring body can be mounted subsequently and, advantageously, frictionally engages the internal and/or external tube. Following the assembly, the aforesaid body thus forms together with the additional components a self-contained unit.

In the rubber sleeve spring the internal and the external tube are rigidly configured over their entire length. In order to achieve a balanced bearing strength over the entire length, it proved to be advantageous when the second spring body includes two partial bodies of a mirror-inverted configuration and is associated with the first spring body.

In embodiments in which the second spring body frictionally engages the internal tube, it proved to be advantageous in order to ensure a sufficient operational safety when the second spring body is adhesively attached to the external circumference of a metallic support sleeve and frictionally engages the internal tube by means of this support sleeve. The so effective adhesive connection between the second spring body and the support sleeve can be produced by direct attaching by means of vulcanization. In connection with the rigidity of the internal tube, the metallic configuration of the support sleeve ensures that the second spring body is in a fixed position over a long period of time.

The second spring body can be configured with different elasticities in two radial planes which are associated with one another in a perpendicular relationship so as to better meet particular demands of use. The mounting of a combustion engine in a vehicle involves such particular demands, for example. In this example, the engine must be supported much more tightly in longitudinal direction than in vertical direction. The configuration of the second spring body can hence be adjusted thereto and, in a quiescent state, it can even be spaced-apart in vertical direction from the relatively movable internal tube or external tube, if necessary. It is also possible to include weakening segments and, possibly, interruptions which are vertically on top of each other in the second spring body.

In accordance with the invention, an elastomeric sleeve spring which has hydraulic damping comprises an internal tube and an external tube which are radial-elastically supported on one another. The sleeve spring includes a first spring body made of elastomeric material for radial-elastically supporting the tubes. The first spring body includes at least two opposing, liquid-filled chambers which are separated by a wall and connected in pairs by means of a damping opening. The sleeve spring also includes a second spring body corresponding to the first spring body and the second spring body is disposed in a gap between the internal and external tubes at an axial distance from the first spring body.

For a better understanding of the invention, together with other and further objects thereof, reference is made to the following description, taken in connection with the accompanying drawing, and its scope will be pointed out in the appended claims.

Referring now to the drawing:

FIG. 1 is a cross sectional view of the rubber sleeve spring,

FIG. 2 is a longitudinal section view of the rubber sleeve spring.

FIG. 3 is a side view of the rubber sleeve spring.

The illustrated rubber sleeve spring includes an internal and an external tube 1, 2 which are radial-elastically supported on one another by means of a first spring body 3 preferably made of rubber. The internal and the external tube preferably are made of a metallic material. They are directly connected to the spring body by vulcanizing the material of which the spring body is made and attaching it thereto.

The external tube 2 has two shells and includes the external, liquid-tight self-contained support sleeve 2.1 and the windowed tube 2.2 disposed therein. The wall of the latter is pierced by radial interruptions in the vicinity of the interspaces of the cross pieces 3.1 of the first spring body and, at the front, this wall is enclosed by the support sleeve 2.1 with continuous flanges which project in radial direction toward the inside. Together with the complementarily configured crimps of the windowed tube 2.2, the flanges enclose continuous channels 8.1 which join the opposite chambers 4, 5 and 6, 7, respectively, in pairs by means of overflow apertures and assume the functions of damping openings.

Like the chambers, they are completely filled with hydraulic liquid. The first spring body 3 is made of a rubber which exhibits low damping action.

The chambers 4, 5, 6, 7 are in axial direction on both sides defined by inclined front walls. The surface extension of the front walls is thus relatively enlarged as compared to known embodiments and in connection with the small thickness and the use of a soft-elastic material for its manufacture it determines that the walls easily swell. Acoustically effective, high frequency vibrations are thus particularly well insulated by means of the rubber sleeve spring in accordance with invention.

In the vicinity of the internal tube 1, the first spring body 3 has cylindrical lugs which project on both sides in axial direction; these lugs serve to place the subsequently mounted partial bodies 10.1 and 10.2 in their correct position. The latter are made of an elastomeric material with high damping properties and at their internal circumference, they are directly adhesively attached to the preferably metallic support sleeves by means of vulcanization. The support sleeves 9 are dimensioned such that after they are placed in the internal tube 1 with axial pressure, their position is fixed and they cannot be moved anymore.

The two partial bodies 10.1 and 10.2 of the second spring body 10 have an oval shape and are mounted such that, in the represented unstressed state, they directly contact the external tube 2 only at two contact points which are vertically on top of one another. Opposite thereto, in stress direction 13 which runs transversely to this direction 12, there is a radial distance between the second spring body 10 and the external tube 2. The rubber sleeve spring as represented hence exhibits a great rigidity in stress direction 12, in stress direction 13, however, a particularly great resilience.

In addition to the radial distance to the external tube 2, the second spring body 10 as outlined in FIG. 2 has two completely penetrating interruptions 14 of an oval shape which are next to the internal tube. The resilience of the second spring body 10 in stress direction 13 is thus further increased. It is not absolutely necessary to configure and mount the second spring body 10 as shown in FIG. 2. Depending on the application, different ways of mounting and a possibly annular or asymmetric configuration can also be realized without further problems. Also, rubber mixtures can be used to manufacture the second spring body 10 which are distinguished by high inner damping action and will suppress the development of great vibration amplitudes.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Elastomeric sleeve spring which has hydraulic damping, comprising:

an internal tube and an external tube which are radial-elastically supported on one another;

a first spring body made of elastomeric material for radial-elastically supporting said tubes;

the first spring body including at least two opposing, liquid-filled chambers which are separated by a wall and connected in pairs by means of a damping opening; and second spring body means for substantially enclosing in an axial direction the first spring body and the second spring body means being disposed in a gap between the internal and external tubes and spaced apart at an axial distance from the first spring body and frictionally engaging the internal tube, in a stress-free state the second spring body means including two spring bodies each contacting the external tube in a stress-free state at only two contact locations in one direction of stress and in a stress-free state the second spring body means having different resiliences in two radial planes which are perpendicularly associated with one another.

2. Elastomeric sleeve spring in accordance with claim 1, in which the second spring body means includes two partial bodies and in which the partial bodies are of a mirror-inverted configuration and associated with the first spring body.

3. Elastomeric sleeve spring in accordance with claim 1, which includes a metallic support sleeve having an external circumference and in which the second spring body means is adhesively connected to the external circumference of the metallic support sleeve and is connected to the internal tube by means of this support sleeve.

4. Elastomeric sleeve spring in accordance with claim 1, in which the second spring body means is made of a rubber which exhibits a higher damping action than the elastomeric material of the first spring body.

* * * * *